United States Patent [19]

Young

[11] Patent Number: 4,494,568

[45] Date of Patent: Jan. 22, 1985

[54] HIGH PRESSURE SENSOR BASE

[75] Inventor: Terry G. Young, Longview, Tex.

[73] Assignee: Joy Manufacturing Company, Pittsburgh, Pa.

[21] Appl. No.: 526,732

[22] Filed: Aug. 26, 1983

[51] Int. Cl.³ .............. F15B 13/02; F16K 17/00; F16K 37/00

[52] U.S. Cl. .............. 137/561 A; 137/15; 137/458; 137/557; 137/798; 251/148

[58] Field of Search .............. 137/15, 315, 458, 557, 137/561 A, 561 R, 798; 251/148

[56] References Cited

U.S. PATENT DOCUMENTS

| | | | |
|---|---|---|---|
| 2,598,961 | 6/1952 | Andrus | 251/148 |
| 2,652,069 | 9/1953 | Goheen | 137/561 A |
| 2,951,498 | 9/1960 | Carver | 137/561 R |
| 3,043,331 | 7/1962 | Peters | 137/458 |
| 3,175,578 | 3/1965 | Paterson et al. | 137/561 A |
| 3,746,047 | 7/1973 | Peters | 137/458 |
| 3,848,633 | 11/1974 | Hurtig et al. | 137/561 A |
| 3,996,965 | 12/1976 | Peters | 137/458 |
| 4,137,942 | 2/1979 | Hargraves et al. | 137/557 |
| 4,320,779 | 3/1982 | Peters | 137/458 |

FOREIGN PATENT DOCUMENTS 1394415  5/1975  United Kingdom ............ 137/458

Primary Examiner—Martin P. Schwadron
Assistant Examiner—John A. Rivell
Attorney, Agent, or Firm—Marvin J. Marnock

[57] ABSTRACT

A sensor base structure (24) for supporting high and low pressure sensors (20,22) having autoclave type connectors (44) and communicating pressurized fluid from the main flowline (10) to the sensors. The sensor base structure comprises a cylindrical manifold (52) having a longitudinal passage (54) therein and including a plurality of lateral bores (58) extending therethrough intersecting the longitudinal passage. One end (60) of each lateral bore threadably receives the autoclave connectors of the respective pressure sensors. The opposite end (61) of the bore (58) threadably receives a plug (62) having an externally threaded portion (64) and a reciprocal autoclave connector (66) facing the pressure sensor to provide a high pressure metal-to-metal seal upon contact with the respective autoclave connectors. Each plug has fluid communication means (70, 72, 74) therethrough such that when the plug is positioned within the lateral bore the reciprocal autoclave connector of the plug is in fluid communication with the longitudinal passage of the manifold. Furthermore, the plug includes a secondary sealing means (76, 78, 80) to provide a seal between the plug and lateral bore of the manifold. The plug allows the respective pressure sensors to be rotated to a preselected rotational alignment relative to each other and the sensor base while providing a metal-to-metal autoclave seal and secondary seal to prevent the escape of pressurized fluid from the sensor base structure.

8 Claims, 3 Drawing Figures

HIGH PRESSURE SENSOR BASE

BACKGROUND OF THE INVENTION

This invention relates generally to a surface safety system for controlling fluid flow through a flowline of an oil or gas well, and more specifically, to a sensor base providing structural support for high and low pressure sensors or other components and communicating pressurized fluid flow from the main flowline to the respective pressure sensors.

The sensor base of the present invention is contemplated for use in safety systems which shut in well production lines ot other flowlines in the event of unduly high or low pressure conditions in the main flowline. The general configuration of this type of safety system is generally shown in U.S. Pat. No. 3,987,817, assigned to the same assignee as the present application. Heretofore, the primary function of the sensor base was to provide a structural support or mount for the high and low pressure sensors. Such a use is shown in U.S. Pat. No. 3,996,965 to Peters, and assigned to the same assignee as the present application. However, in recent years, the oil and gas industries have constructed pipelines and other fluid flow handling structures having extremely high operating pressures (e.g. 15,000 psi and higher). The American Petroleum Institute has developed standards which typically require test and gauge connections subjected to main flowline pressure conditions of 15,000 psi or higher to include autoclave metal-to-metal connector assemblies. Therefore, the high and low pressure sensors presently used have male autoclave fittings at one end which are received within a female receptacle in the sensor base to provide a high pressure metal-to-metal connection. The problem associated with autoclave fittings is that they provide a high pressure metal-to-metal seal in only one position, when the male autoclave end solidly contacts the female autoclave receptacle. It is difficult, if not impossible, to accurately control the rotational orientation of the pressure sensor which is determined when the autoclave end of the pressure sensor sealingly contacts the autoclave receptacle of the sensor base. Ordinarily this would cause no problems, however, high and low pressure sensors usually have diametrically opposed inlet and outlet ports which require piping or conduits running between them or to other components of the safety system. Accordingly, it is desirable to have the inlet and outlet ports of the respective high and low pressure sensors line up with other or whose axes are all in the same plane. The prior art devices do not have the capability to line up the inlet and outlet ports of high and low pressure sensors having autoclave connector assemblies, thereby, creating difficult and costly piping arrangements to connect together the various components of the safety system. Furthermore, such a piping arrangement can be of unsightly appearance and confusing to maintenance and operating personnel, thereby, creating a dangerous operating condition.

SUMMARY OF THE INVENTION

It is therefore a primary object of the invention to provide an improved sensor base for use in conjunction with high and low pressure sensors which overcomes the aforementioned disadvantages of the prior art devices.

It is a further object of the invention to provide an improved sensor base for use in a fluid control system such as a safety system for oil and gas wells which has adjustable autoclave receptacles for receiving male autoclave connectors and providing axial and rotational adjustments of the male autoclave connectors relative to the sensor base for simplified installation purposes.

It is a further object of the invention to provide an improved sensor base for use in a fluid control system which facilitates the overall installation and piping arrangements of the system providing a cost efficient installation and aesthetic appearance.

It is a further object of the invention to provide an improved sensor base for use in conjunction with high and low pressure sensors having male autoclave connectors which allow axial and rotational adjustment of the high and low pressure sensors relative to the sensor base so piping arrangements between the pressure sensors and other components of the fluid control system may be easily installed providing a cost efficient installation and overall aesthetic appearance of the fluid control system.

Various other objects, advantages and features of the invention will become apparent to those skilled in the art upon examination of the following description of a preferred embodiment of the invention and the accompanying drawings.

The present invention is directed to an improved sensor base for use in a fluid control system of the general type described above. The sensor base is intended as a structural support for high and low pressure sensors and communicates pressurized fluid from the main flowline to the respective high and low pressure sensors. The sensor base comprises a cylindrical housing or manifold having a longitudinal passage therein which is blocked at both ends of the manifold. The manifold includes a plurality of lateral bores extending therethrough intersecting the longitudinal passage. One side of each lateral bore threadably receives a component having a male autoclave connector such as the high and/or low pressure sensor or an in-line test valve which communicates with the main flowline. The other side of each lateral bore threadably receives a plug having a threaded portion on one end and a female autoclave connector on the other end. Each plug includes a circumferential groove intermediate its ends, a radially extending cross port communicating with the circumferential groove, and an axial passage intersecting the cross port and open to the female autoclave end of the plug. The plug is positioned within the lateral bore such that the cross port and circumferential groove are in fluid communication with the longitudinal passage of the manifold and the female autoclave connector contacts the male autoclave connector of the components to provide a high pressure metal-to-metal seal between the plug and particular component. The plug also includes a pair of circumferential seal grooves positioned on opposite sides of the circumferential cross port groove for receiving O-rings and back-up rings to provide another high pressure seal between the plug and lateral bore of the manifold such that pressurized fluid in the longitudinal passage of the manifold or cross port of the plug is unable to escape exteriorly of the sensor base.

The plug as described above allows the various components having autoclave type connectors to be rotated to a preselected rotational orientation or alignment relative to each other and the sensor base while still providing a metal-to-metal autoclave type seal by threading the plug and female autoclave connector into solid engagement with the component and male autoclave connector once the proper rotational orientation of the component is set.

BRIEF DESCRIPTION OF THE DRAWINGS

In the accompanying drawings which form part of the specification and are to be read in conjunction therewith.

The following is a detailed discussion and description of a preferred embodiment of the sensor base of this invention, such being made with reference to the drawings whereupon the same referenced numerals are used to indicate the same or similar parts and/or structure. It is understood that such discussion and description is not to unduly limit the scope of the present invention, for the invention may admit to other equally effective embodiments.

DESCRIPTION OF A PREFERRED EMBODIMENT

Figure 1:
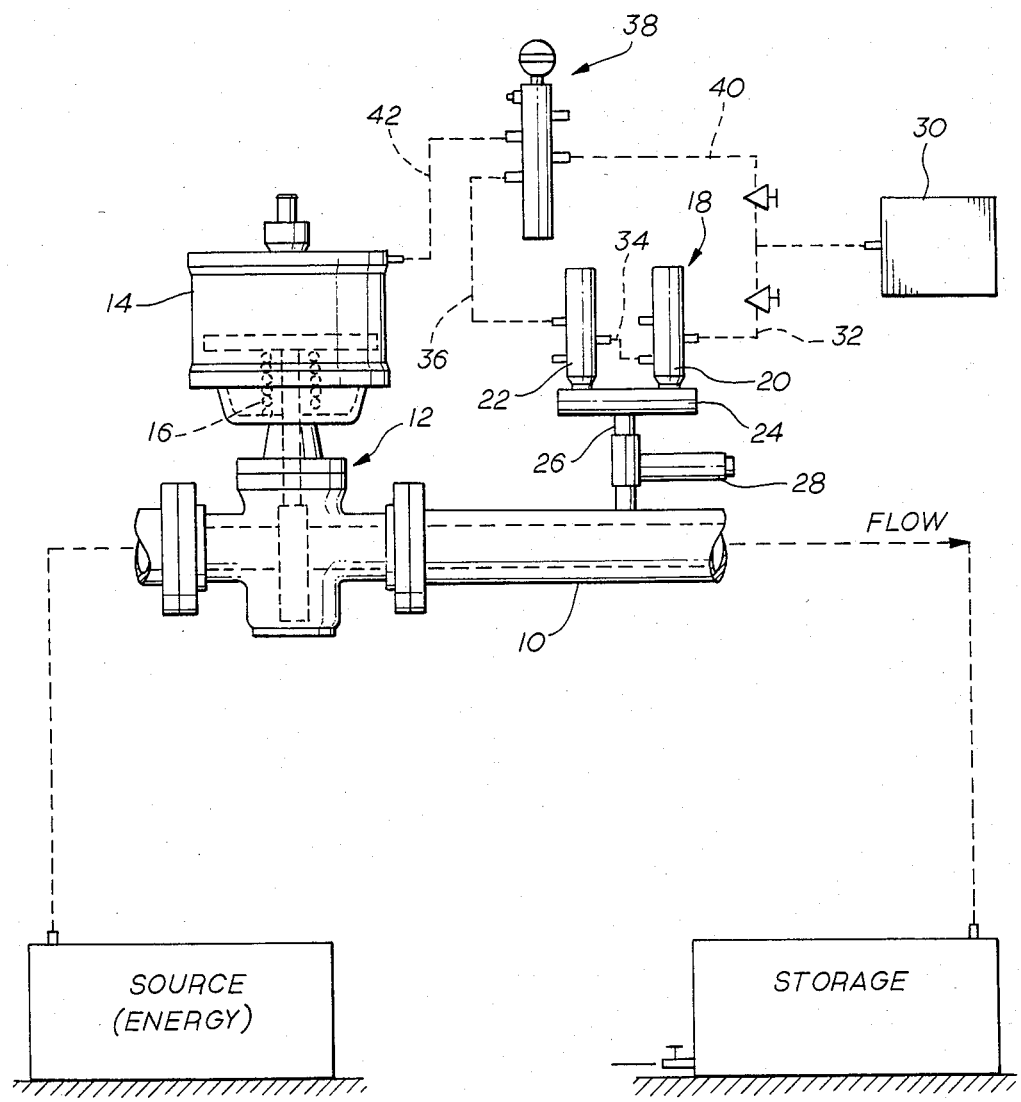
FIG. 1 is a schematic drawing illustrating one arrangement in which the sensor base of this invention may be employed in a system to control the opening and closing of a gate valve in a main flowline passage.

Referring now to the drawings for better understanding of this invention, and more particularly to FIG. 1 in which the high pressure sensor base of the present invention is shown arranged in a safety system for controlling high pressure fluid flow (e.g. 15,000 psi and higher) through a main flowline 10 which is typically the production line of an oil or gas well. A high pressure gate valve 12 forms a surface safety valve which is opened and closed by a hydraulic or pneumatic actuator 14 in order to open and close main flowline 10. Actuator 14 maintains gate valve 12 in the open position when pressurized pilot fluid is applied to the actuator, while bleeding of pilot fluid from actuator 14 permits a spring 16 or the like to move gate valve 12 to the closed position.

The pressure in main flowline 10 is sensed by a high-low pressure sensor assembly generally designated 18. A high pressure sensor 20 and a low pressure sensor 22 are mounted on a sensor base 24 which forms a specific embodiment of the present invention. The sensor base 24 receives the high pressure main flowline fluid from a conduit 26 connected to the main flowline 10. In some applications, an in-line test valve 28 is connected in conduit 26 for testing pilot sensors 20 and 22, and the test valve 28 has a side test port 29 for receiving such test fluid pressure. A pilot fluid source 30, such as a pressurized cylinder of gas or hydraulic fluid, applies pilot fluid to high pressure sensor 20 through a conduit 32. A short conduit 34 extends between high pressure sensor 20 and low pressure sensor 22, while another conduit 36 extends from low pressure sensor 22 to connect with a control valve 38. The high and low pressure sensors 20 and 22 have a plurality of side ports 39 for receiving the various conduits communicating pilot fluid between the various components of the safety system. A conduit 40 extends directly from fluid source 30 to control valve 38, and conduit 42 extends from control valve 38 to actuator 14.

High pressure sensor 20 is set to fire to the closed position if the pressure in main flowline 10 exceeds the predetermined high pressure level corresponding to the setting of the high pressure sensor 20. Conversely, low pressure sensor 22 is set to fire to the closed position when the pressure in main flowline 10 is below a predetermined low pressure level corresponding to the setting of low pressure sensor 22. Thus, an operating pressure range of the safety system is defined between the low pressure setting of low pressure sensor 22 and high pressure setting of high pressure sensor 20. When the main flowline pressure is within the operating range, pilot fluid is delivered from fluid source 30 through conduit 32, high pressure sensor 20, conduit 34, low pressure sensor 22 and conduit 36 to control valve 38 to bias control valve 38 to an open position. When control valve 38 is in the open position, fluid passes from pilot fluid source 30, through conduit 40, control valve 38 and conduit 42 to actuator 14 so that gate valve 12 is maintained in the open position. If the main flowline pressure drops below the setting of low pressure sensor 22, the flow from conduit 34 to conduit 36 is interrupted by low pressure sensor 22 and the control valve 38 moves from the open position to a closed position in order to bleed the fluid from actuator 14 so that gate valve 12 will close. If the pressure in main flowline 10 rises above the setting of high pressure sensor 20, flow is interrupted by high pressure sensor 20 between conduits 32 and 34 to cause the control valve 38 to move from the open to closed position wherein fluid is bled from actuator 14 for closing gate valve 12. For further details concerning the operation of pressure sensors 20 and 22 reference is made to U.S. Pat. No. 3,996,965, the entire disclosure of which is incorporated by this reference.

Figure 2:
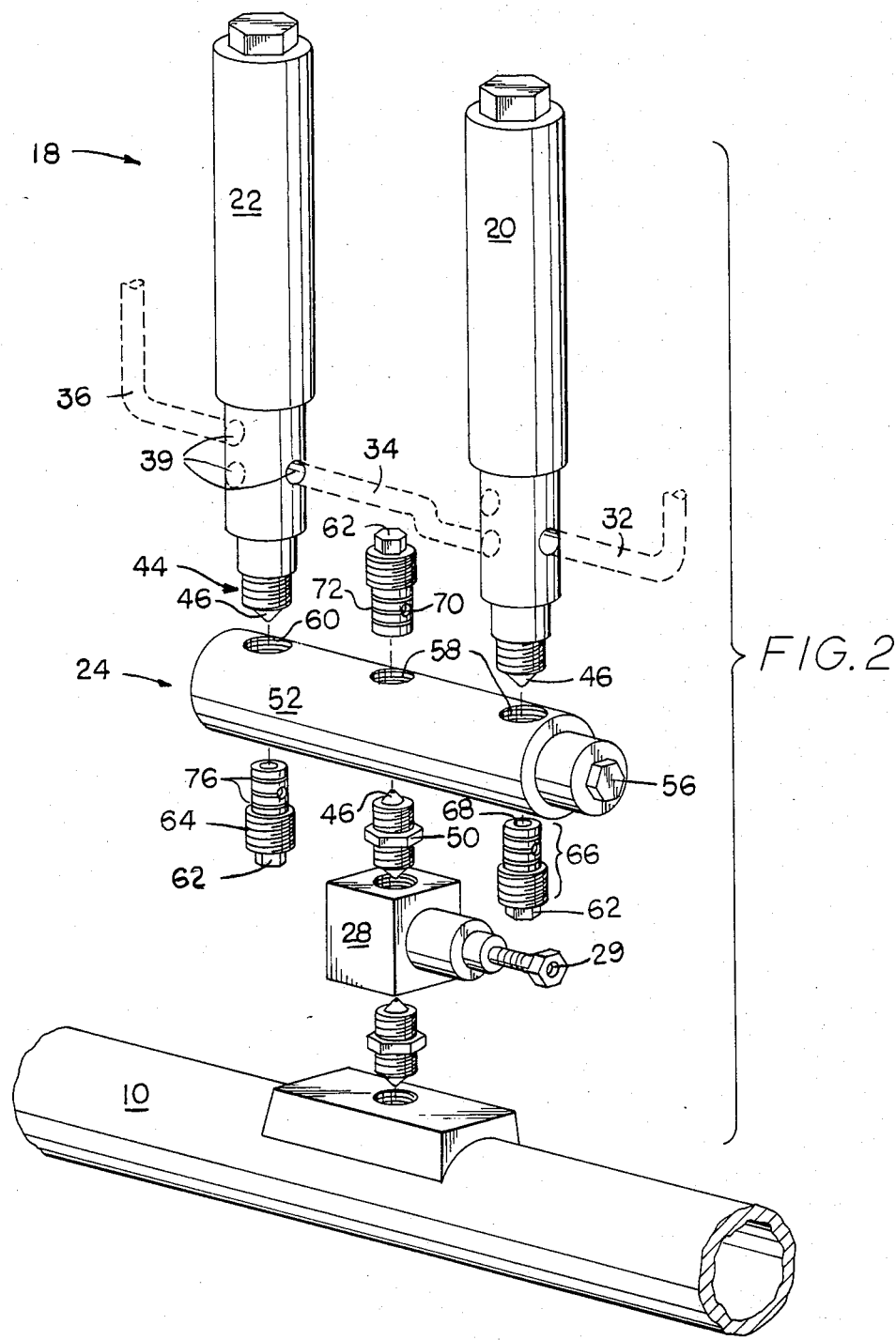
FIG. 2 is an exploded persepctive view of a portion of the system shown in FIG. 1 utilizing the sensor base of this invention and including high and low pressure sensors, an in-line test valve, and a portion of the main flowline.
Figure 3:
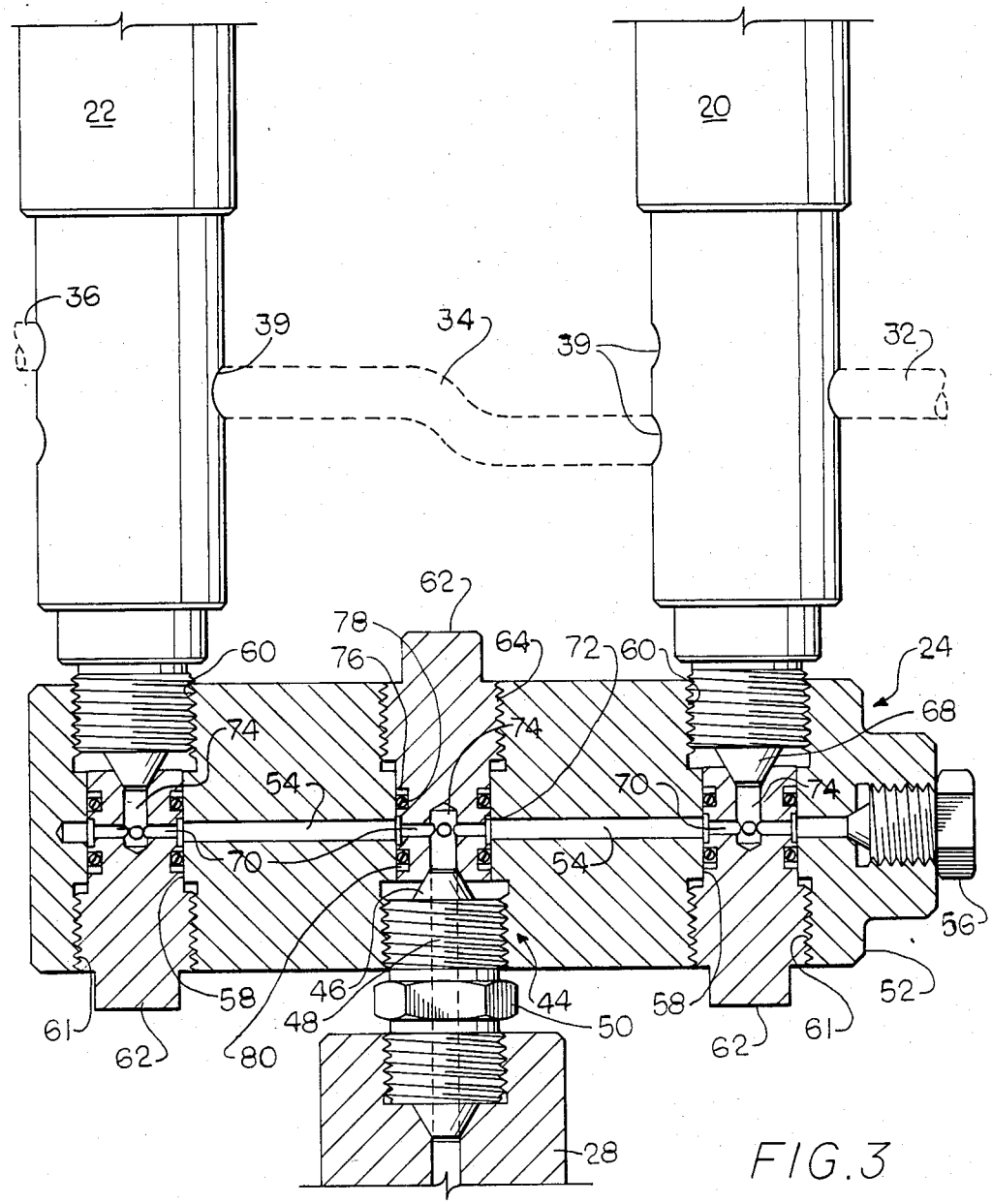
FIG. 3 is an enlarged sectional view of the sensor base shown in FIG. 2, showing the details of the present invention.

Referring to FIGS. 2 and 3, wherein the high-low pressure sensor assembly 18 is shown utilizing the sensor base of the present invention, with such being indicated generally at 24, and shown receiving high and low pressure sensors 20 and 22 and in-line test valve 28 communicating with the main flowline 10. The sensor base disclosed herein is intended for use in a high pressure system wherein fluid pressures in main flowline 10 are in the range of 15,000 psi and higher. Industry standards typically require test and gauge connectors subjected to such high pressures to include high pressure metal-to-metal autoclave type connector assemblies throughout. An autoclave type connector assembly as used herein is intended to describe a high pressure metal-to-metal connection which includes: a male autoclave connector on one component having a threaded portion and an end surface defined by an outwardly extending frusto-conical cone with a fluid passageway therethrough opening to its outermost end surface; and a female autoclave connector on another component having a threaded portion and an internal end surface defined by an inwardly extending frusto-conical surface with a fluid passageway therethrough opening to its end surface such that upon engagement of the male and female autoclave connectors the reciprocal frusto-conical surfaces solidly contact each other to provide a high pressure metal-to-metal seal and the fluid passageways therethrough provide fluid communication through the autoclave connector assembly. As shown in FIGS. 2 and 3, a male autoclave connector 44 with outwardly extending frusto-conical end surface 46 and axial fluid passageway 48 is provided on each of the various components received in the sensor base 24 such as the high and low pressure sensors 20 and 22 and on a double sided connector 50 threadably attached to the in-line test valve 28 for connecting the pressure sensors and test valve to the sensor base 24.

The sensor base 24 includes a generally cylindrical body or manifold 52 having a longitudinal passage 54 therein. The passage 54 opens to one end of the manifold 52 which is blocked by an end cap 56. The manifold 52 has a plurality of generally parallel lateral bores 58 extending therethrough which intersect the longitudinal passage 54. Each lateral bore 50 has internally threaded portions 60 and 61 at the opposite ends thereof adjacent the outer surface of the manifold 52. One end 60 of each lateral bore 58 threadably receives the male autoclave connector 44 of one of the components.

Each lateral bore 58 also threadably receives a plug 62 in the other end 61 thereof opposite the male autoclave connector 44 of one of the components. The plug 62 includes an externally threaded portion 64 on one end thereof and a female autoclave connector 66 on the other end thereof. The female autoclave connector 66 has an inwardly extending frusto-conical end surface 68. The plug 62 further includes at least one radially extending cross port 70 communicating with a circumferential groove 72 positioned approximately midway between the ends of the plug 62 and includes an axial passageway 74 intersecting the cross port 70 and opening to the center of the frusto-conical end surface 68. A pair of circumferential seal grooves 76 are positioned on opposite sides of the circumferential groove 72 of the plug 62 and each has an O-ring 78 and back-up ring 80 mounted therein to provide a high pressure seal between the exterior circumferential wall of the plug 62 and the lateral bore 58 of the manifold 52. The plug 62 is threadably received within the lateral bore 58 such that the female autoclave connector 66 is facing the male autoclave connector 44 of one of the components and the cross port 70 and circumferential groove 72 are positioned in fluid communuication with the longitudinal passage 54 of the manifold 52. Upon engagement of the autoclave end surfaces 46 and 68 of the male autoclave connector 44 and female autoclave connector 66, respectively, a high pressure metal-to-metal seal is obtained between the plug 62 and component while providing fluid communication through the autoclave connection via fluid passageways 48 and 74.

OPERATION OF THE PREFERRED EMBODIMENT

It is the purpose and function of the present invention to provide a high pressure sensor base which threadably receives various components having autoclave type connectors and which allows adjustable rotational orientation of the components with respect to each other and the sensor base to provide for ease of assembly, simplicity of design, and an overall aesthetic appearance of the piping arrangements for the fluid control system. For example, as shown in FIG. 2, it is necessary to connect several conduits 32, 34 and 36 between the side ports 39 of the high and low pressure sensors 20 and 22 and various other components of the safety system and it is desirable to have all the side ports 39 of the respective pressure sensors line up with each other, or in other words, which have axes all in the same plane, to simplify piping installation. Furthermore, it is sometimes desirable to have the test port 29 of the in-line test valve 28 line up so that it is pointing in a particular direction in relation to the sensor base or other component of the safety system for ease of hook-up and operation.

To accomplish such a function and referring now again to FIG. 2, first, the manifold 52 threadably receives a plug 62 in one end 61 of each lateral bore 58. The plug 62 is threaded into the lateral bore 58 a preselected distance until the cross port 70 and circumferential groove 72 are in fluid communication with the longitudinal passage 54 of the manifold 52, and such that the female autoclave connector 66 and end surface 68 are facing the other end 60 of the lateral bore 58 as shown in FIG. 3. Secondly, the male autoclave connector 44 with end surface 46 of the particular component being attached, such as the high pressure sensor 20, low pressure sensor 22, or in-line test valve 28 is threadably received within the other end 60 of the lateral bore 58 until the end surfaces 46 and 68 make contact. If the particular component in question does not have the proper rotational orientation with respect to the sensor base or other components of the safety system, the plug 62 is then adjusted to allow the component to be further rotated until the optimal line-up of the side ports 39 or test port 29 has been obtained. Once the particular component is properly adjusted, the plugs 62 are firmly rotated into engagement with the component such that the inwardly extending frusto-conical end surface 68 of the plug's female autoclave connector 66 solidly engages the outwardly extending frusto-conical end surface 46 of the component's male autoclave connector 44 to provide a high pressure metal-to-metal seal between the plug 62 and component. In this manner, a sensor base 24 is provided which allows components having autoclave type connectors to be adjusted in rotational orientation with respect to each other or the sensor base to simplify installation of the fluid control system while providing a high pressure seal to prevent the escape of pressurized fluid exteriorly to the sensor base.

It is to be understood that the foregoing description of a preferred embodiment of the invention has been presented for purpses of illustration and description and is not intended to limit the invention to the precise form disclosed. For example, the sensor base is shown receiving high and low pressure sensors and an in-line test valve, however, the invention applies to a sensor base receiving any component having a male autoclave connector. Furthermore, the plug arrangement shown herein is not necessarily limited to use in a sensor base as it can be utilized in any housing where autoclave type connectors are used and the rotational orientation of the component utilizing the autoclave type connector is important. It is to be appreciated, therefore, that changes in details of the illustrated construction may be made by those skilled in the art, within the scope of the appended claims, without departing from the spirit of the invention.

What is claimed is:

1. An apparatus for receiving at least one component having an autoclave connector with an autoclave end surface and having a flow passage therein in communication with the autoclave end surface, which comprises:

a manifold having a longitudinal passage therein in communication with a fluid pressure source and having a lateral bore extending therethrough and intersecting the longitudinal passage, the lateral bore having internally threaded portions at the opposite ends thereof adjacent the outer surfaces of the manifold such that one end of the lateral bore threadably receives the autoclave connector of the component;

a cylindrical plug having an externally threaded end portion which is threadably received in the other end of the lateral bore opposite the end receiving the component, the plug further having a reciprocal autoclave connector on the other end of the plug with a reciprocal autoclave end surface facing the autoclave end surface of the component so that upon rotation of either the plug or component establishing contact between the respective autoclave end surfaces a high pressure metal-to-metal seal is obtained, the plug including a peripheral annular groove intermediate the externally threaded portion and the autoclave end surface and a radially extending cross port communicating with the annular groove and positioned in fluid communication with the longitudinal passage of the manifold, and further including an axial bore intersecting the cross port and opening to the autoclave end surface of the plug to provide fluid communication from the fluid pressure surface, through the manifold and plug of the apparatus, to the flow passage of the component thereby providing a metal-to-metal autoclave connection which is readily obtainable at a preselected rotation orientation of the component relative to the apparatus; and sealing means provided on the plug on opposite sides of the annular groove for sealing between the plug and the lateral bore so that pressurized fluid in the longitudinal passage of the manifold or cross port of the plug is unable to communicate with the threaded portions of the lateral bore or exteriorly of the apparatus.

2. An apparatus as set forth in claim 1, in which the sealing means comprises a pair of peripheral seal grooves located around the exterior of the plug and positioned on opposite sides of the peripheral annular groove, the seal grooves each having an O-ring and back-up ring mounted therein to provide a high pressure seal between the plug and lateral bore of the apparatus.

3. An apparatus as set forth in claim 2, in which the component comprises a pair of pressure sensors for sensing high and low pressure conditions, each sensor having inlet and outlet side ports and autoclave connectors with autoclave end surfaces, which are threadably received within a respective lateral bore of the manifold, the autoclave end surface of the pressure sensors facing the autoclave end surface of the plug so that upon rotation of either the plug or pressure sensor establishing contact between the respective autoclave end surfaces a high pressure metal-to-metal seal is otained, thereby, providing an autoclave connection which is readily obtainable at preselected rotational orientation of the high and low pressure sensors relative to each other to allow the inlet and outlet side ports to be aligned with axes in the same plane to simplify piping arrangements therebetween.

4. An apparatus as set forth in claim 3, in which another component comprises a dual ended autoclave connector, one end thereof being received with the manifold and the other end being received within an in-line test valve in communication with the fluid pressure source, the test valve having a reciprocal autoclave end surface facing one end of the dual ended autoclave connector to provide a high pressure metal-to-metal seal, the other end of the dual ended autoclave connector being received within the manifold and facing the autoclave end surface of the plug so that upon rotation of either the plug or in-line dual test valve establishing contact between the autoclave end surfaces a high pressure metal-to-metal seal is obtained, thereby, providing an autoclave connection which is readily obtainable at preselected rotational orientation of the in-line test valve relative to the apparatus.

5. A sensor base structure for supporting high and low pressure sensors having autoclave connectors with autoclave end surfaces and having flow passages therein in communication with the autoclave end surfaces, which comprises:

a manifold having a longitudinal passage therein in communication with the fluid pressure source and having a plurality of lateral bores extending therethrough and intersecting the longitudinal passage, each lateral bore having internally threaded portions at the opposite ends thereof adjacent the outer surfaces of the manifold such that one end of each lateral bore threadably receives the autoclave connector of either the high or low pressure sensor;

a cylindrical plug having an externally threaded end portion which is threadably received in the other end of each lateral bore opposite the end receiving the pressure sensors, the plug having a reciprocal autoclave connector on the other end of the plug with a reciprocal autoclave end surface facing the autoclave end surface of the pressure sensor so that upon rotation of either the plug or pressure sensor establishing contact between the respective autocalve end surfaces a high pressure metal-to-metal seal is obtained, the plug including a peripheral annular groove intermediate the externally threaded portion and the autoclave end surface and a radially extending cross port communicating with the annular groove and positioned in fluid communication with the longitudinal passage of the manifold, and further including an axial bore intersecting the cross port and opening to the autoclave end surface of the plug to provide fluid communication from the fluid pressure source, through the sensor base structure, to the high and low pressure sensors, thereby, providing a metal-to-metal autoclave connection which is readily obtainable at preselected rotational orientation of the high and low pressure sensors relative to the sensor base structure; and sealing means provided on the plug on opposite sides of the annular groove for sealing between the plug and lateral bore so that pressurized fluid from the fluid pressure source, longitudinal passage of the manifold, or cross port of the plug is unable to communicate with the threaded portions of the lateral bores or exteriorly of the sensor base structure.

6. A sensor base structure as set forth in claim 5, in which the sealing means comprises a pair of peripheral seal grooves located around the exterior of the plug and positioned on opposite sides of the peripheral annular groove, the seal grooves each having an O-ring and back-up ring mounted therein to provide a high pressure seal between the plug and lateral bore of the sensor base structure.

7. A sensor base structure for supporting high and low pressure sensors each having inlet and outlet side ports and including an autoclave connector on one end with an autoclave end surface, the pressure sensors having a central passage therein communicating with the autoclave end surface and adapted to be placed in communication with the sensor base structure and a fluid pressure source, which comprises:

a manifold having a longitudinal passage therein in communication with the fluid pressure source and having a plurality of lateral bores extending therethrough and intersecting the longitudinal passage, each lateral bore having internally threaded portions at the opposite ends thereof adjacent the outer surfaces of the manifold such that one end of each lateral bore threadably receives the autoclave connector of either the high or low pressure sensor;

a cylindrical plug having an externally threaded end portion which is threadably received in the other end of each lateral bore opposite the end receiving the pressure sensors, the plug having a reciprocal autoclave connector on the opposite end thereof with a reciprocal autoclave end surface facing the autoclave end surface of the pressure sensor so that upon rotation of either the plug or sensor establishing contact between the respective autoclave end surfaces a high pressure metal-to-metal seal is obtained, the plug including a peripheral annular groove intermediate the externally threaded portion and autoclave end surface and a radially extending cross port communicating with the annular groove and positioned in fluid communication with the longitudinal passage of the manifold, and further including an axial bore intersecting the cross port and opening to the autoclave end surface of the plug to provide fluid communication from the fluid pressure source, through the sensor base structure, to the high and low pressure sensors, thereby, providing a metal-to-metal autoclave connection which is readily obtainable at preselected rotational orientation of the high and low pressure sensors relative to each other and the sensor base to allow the inlet and outlet side ports of the respective pressure sensors to be aligned with axes in the same plane to simplify piping arrangements therebetween; and sealing means provided on the plug on opposite sides of the annular groove for sealing between the plug and lateral bore so that pressurized fluid in the longitudinal passage of the manifold or cross port of the plug is unable to communicate with the threaded portions of the lateral bores or exteriorly of the sensor base structure.

8. A sensor base structure as set forth in claim 7, in which the sealing means comprises a pair of peripheral seal grooves located around the exterior of the plug and positioned on opposite sides of the peripheral annular groove, the seal grooves each receiving an O-ring and back-up ring therein to provide a high pressure seal between the plug and lateral bore of the sensor base structure.

* * * * *